United States Patent
Tatina

(10) Patent No.: US 6,974,288 B2
(45) Date of Patent: Dec. 13, 2005

(54) CUSHIONED BANDING ANCHOR

(75) Inventor: Richard A. Tatina, Countryside, IL (US)

(73) Assignee: Portec Rail Products Inc., Pittsburgh, PA (US)

( * ) Notice: Subject to any disclaimer, the term of this patent is extended or adjusted under 35 U.S.C. 154(b) by 0 days.

(21) Appl. No.: 10/777,553

(22) Filed: Feb. 12, 2004

(65) Prior Publication Data

US 2005/0180834 A1 Aug. 18, 2005

(51) Int. Cl.[7] ............................................. B61D 45/00

(52) U.S. Cl. .................... 410/106; 410/36; 410/97; 410/110

(58) Field of Search ........................ 410/34–37, 39–40, 410/42, 97, 100–102, 106, 110, 116; 24/129 D, 24/115 K, 265 CD, 115 L; 248/499

(56) References Cited

U.S. PATENT DOCUMENTS

| | | | | |
|---|---|---|---|---|
| 2,449,300 A | * | 9/1948 | Jones | 410/106 |
| 2,599,873 A | * | 6/1952 | Smith | 410/110 |
| 4,530,483 A | * | 7/1985 | Nordstrom | |
| 5,330,300 A | * | 7/1994 | Jones et al. | 410/106 |
| 5,618,139 A | * | 4/1997 | Graf et al. | 410/69 |
| 6,142,718 A | * | 11/2000 | Kroll | 410/106 |
| 6,709,209 B2 | * | 3/2004 | Zhan et al. | 410/116 |
| 6,729,815 B2 | * | 5/2004 | Hornady | 410/47 |

* cited by examiner

Primary Examiner—Stephen Gordon
(74) Attorney, Agent, or Firm—Schiff Hardin LLP

(57) ABSTRACT

A cushioned banding anchor for securement of a load to a loading platform by use of a band having a loop at least at one end, and a banding anchor body with a cushioned roller retained within an inside aperture of the anchor body. The cushioned roller is designed to be positioned within the loop of the band. The banding anchor body has a loop portion at one end which is connected to the loading platform.

19 Claims, 5 Drawing Sheets

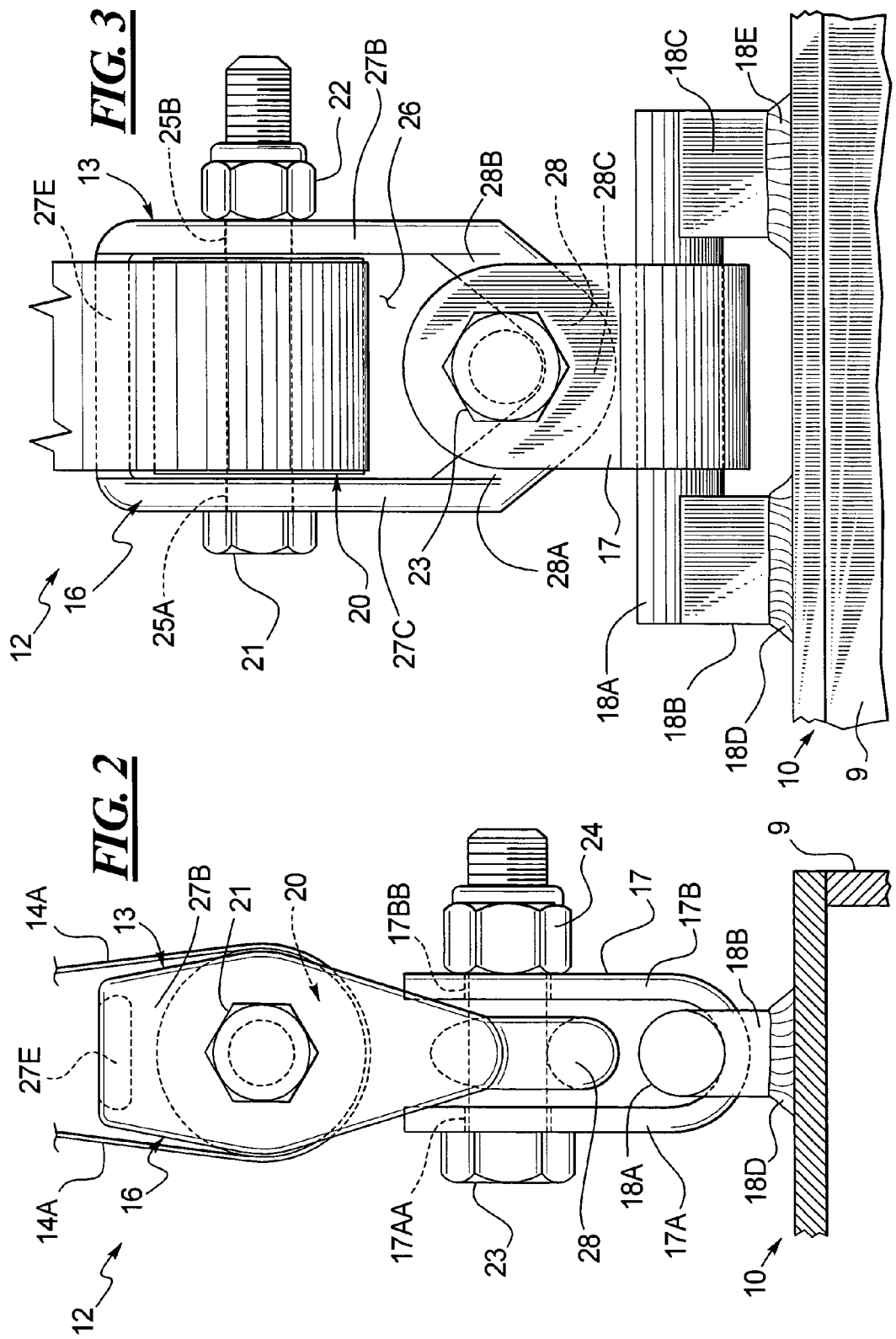

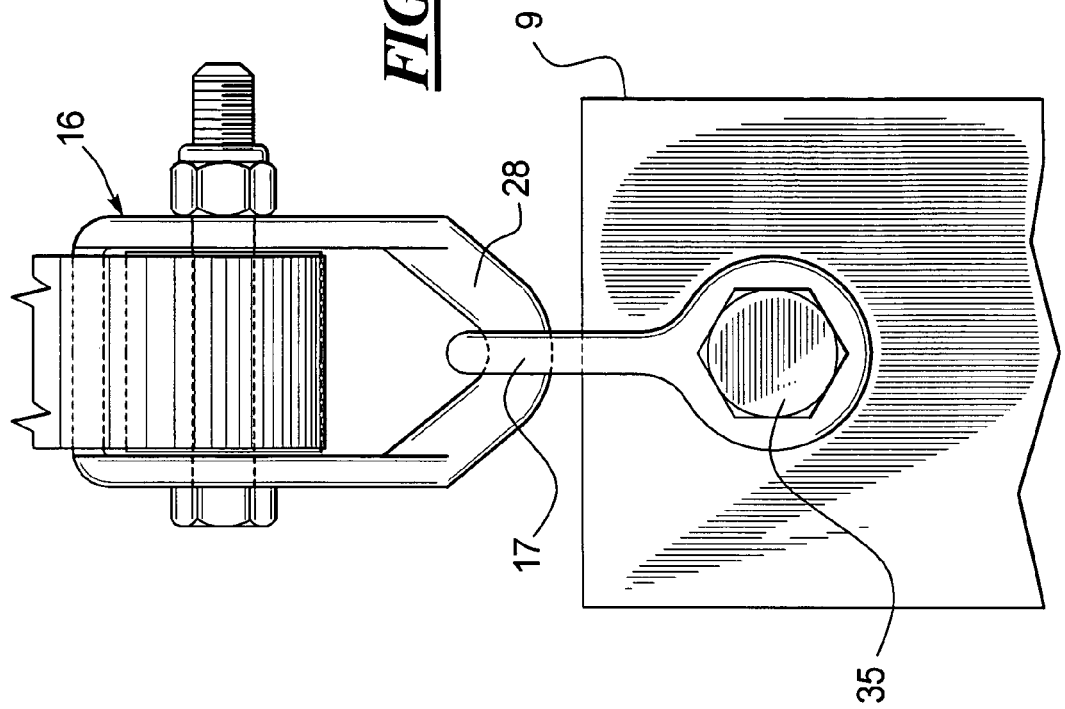
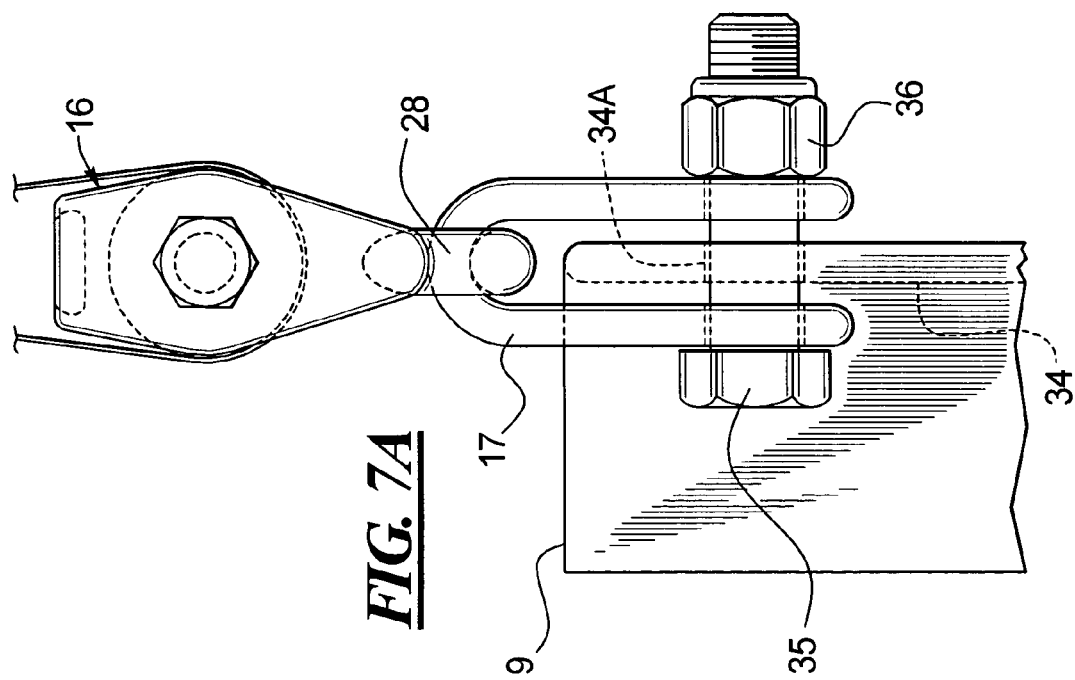

CUSHIONED BANDING ANCHOR

BACKGROUND

One of the more challenging commodities to safely transport by rail is steel or iron pipe. The sizes range to 72" diameter and up to 80 feet in length. Methods for securing the pipe on railroad flat cars include chain, side stakes, polyester webbing and steel banding. The Association of American Railroads Open Top Loading Rules, Section 2 devotes an entire Part to figures defining acceptable pipe loads and tie down methods. About one quarter of these methods involve the use of 2" high tension steel banding. After loading the railcar with bundles of pipe, 2" high tension steel banding is passed through the round anchor welded to the deck of the railcar at one side. A loop is formed and connected to the banding with one or more crimped seals. The free end of the banding is passed over the top of the pipe and looped through the round anchor on the opposite side of the railcar, tensioned and the seals crimped. A special tool is used to tension the banding, and crimped seals are applied to the loop at the end of the banding to secure the pipe load.

Shocks and vibrations during transit (normal occurrences which railcars and the loaded commodities experience) have been found to cause fatigue cracks in the loop of the high tension steel band where it is in contact with the anchor on the railcar. Fatigue cracks in the banding can lead to catastrophic band failure with the potential for losing the load on the right of way, thereby creating hazardous conditions for rail traffic. Borrowing the technology from another approved method of shipping lumber, a Constant Tension Device (CTD), used to maintain tension on the high tension band, was added to the railcars in pipe service. The addition of the CTD eliminated banding fatigue cracks. However, the length of the CTD placed the sealed loop at a height that was difficult to reach with the tensioning and crimping tools. Pipes loaded to the full car width or beyond were difficult to tie down because the length of the CTD placed the seal on the pipe. This would not allow the crimping tool to grip the seal.

One method to isolate the shock and vibration employs a member having an upper loop of a substantially rectangular opening therein and a bottom bar beneath the loop having an entrance aperture. A webbing is employed which loops around a load strap anchor welded to the railcar with a free end received by the open ended bottom bar and a looped portion attached to the bottom leg of the upper loop portion. The 2" steel banding then loops through the upper portion or leg of the loop portion. This is known as the Ireco Vibration Isolation Connection unit or "VIC" for short.

SUMMARY

It is an object to provide a compact device that prevents fatigue cracking in the loop.

A cushioned banding anchor is provided for securement of a load to a loading platform by use of a band having a loop at least at one end. A banding anchor body has a cushioned roller retained within an inside aperture of the anchor body. The cushioned roller is designed to be positioned within the loop of the band. The banding anchor body has a loop portion at one end. A frame attachment of the loading platform is connected to the loop portion of the banding anchor body.

BRIEF DESCRIPTION OF THE DRAWINGS

FIG. 2 is an end view of the anchor system of FIG. 1;

FIG. 3 is a side view of the system shown in FIG. 1;

FIGS. 7A and 7B are respective end and side views of a still further embodiment for anchoring the cushioned banding anchoring system of FIG. 1.

DESCRIPTION OF THE PREFERRED EMBODIMENTS

Figure 1:
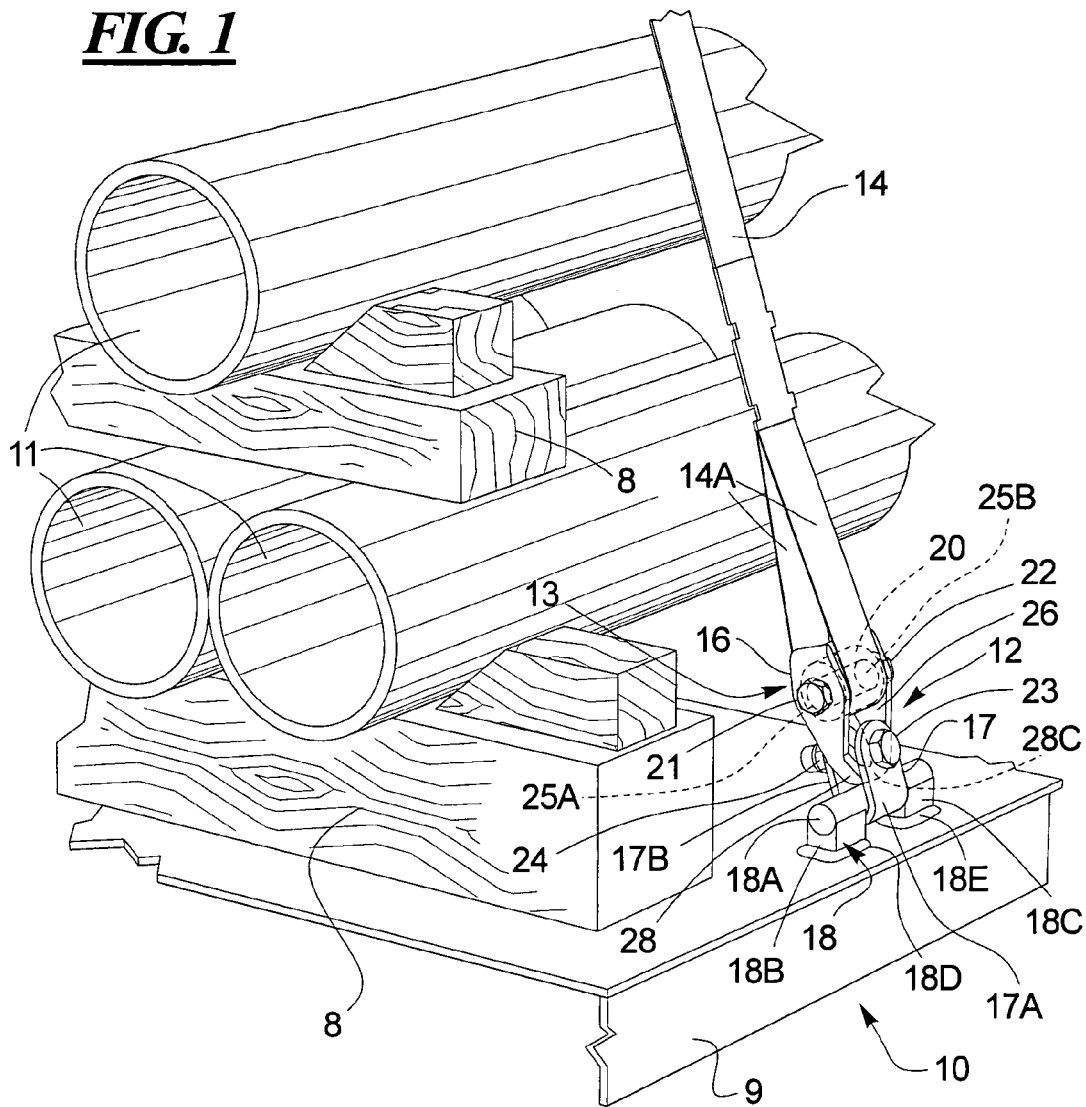
FIG. 1 is a perspective view of the cushioned banding anchor system employed on a railcar.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

With the disclosed embodiments, a housing is provided containing an elastomeric cylinder assembled on an axle. The elastomeric cylinder provides cushioning, a large diameter for the steel banding, and is capable of rolling when the banding is pulled through the device. The housing is designed so that it can be attached to a round bar anchor or a triangular link, or with a forged loop.

In the above applications, the cushioned banding anchor system is not subject to easy unauthorized removal from the railcar. The system is also about nine inches shorter (measured from the railcar anchorment to the bottom of the loop in the high tension banding) than in the prior art constant tension device previously described. This allows the tensioning and crimping tools to be applied to the steel banding in a more ergonomically correct height and also the seal to be placed tangent to the pipe.

The roller may be an all elastomeric cylinder (such as polyurethane), a metallic tube with an elastomeric interior core, or a metallic tube with an elastomeric core and a metallic center tube.

A more detailed description of the preferred embodiments will be made with reference to the drawing figures.

As shown in the perspective view of FIG. 1, a railcar frame or loading platform 9 of a railcar 10 is utilized, for example, in conjunction with the cushioned banding anchor system generally shown at 12. Although railcars are employed, the system may also be employed on other types of transportation vehicles or loading platforms, or the like.

The banding system 12 secures a plurality of pipes 11 which are typically spaced apart by blocks 8.

The system includes a cushioned banding anchor 13 engaging with a loop 14A of a band 14 such as a 2" high tension steel securement band which loops over the pipes.

One of the cushioned banding anchors 13 is provided at each end of the band 14 with only one being shown in FIG. 1 on one side of the stack of pipes.

The cushioned banding anchor 13 includes a cushioned banding anchor body 16 and a U-shaped shackle 17 which loops around the railcar frame attachment 18 having a bar or cylindrical member 18A connected to the frame 9 of the railcar by downwardly extending ears 18B, 18C which support the attachment bar 18A. Welds 18D, 18E attach the support legs or ears 18B, 18C to the railcar frame or loading platform 9.

Within a central opening 26 of the banding anchor body 16 (which may comprise a casting) is provided in attachment cylinder 20 which is preferably elastomeric and rotates about an axle formed by a hex bolt 21 retained by a lock nut 22 such as by a nylon insert lock nut. This axle is supported in apertures 25A and 25B in sidewalls of the anchor body 16.

The anchor body 16 has at one end a V-shaped loop engagement portion 28 having a rounded portion 28C in which rests another hex bolt 23 retained by a lock nut 24 having, for example, a nylon insert. The hex bolt 23 serves as a retaining element for the shackle 17 and is received in apertures 17AA and 17BB in side legs 17A and 17B respectively of the shackle 17. The shackle loops around the rod or bar 18A of the frame attachment 18 on the railcar frame 9.

As shown in FIGS. 2 and 3, the central opening 26 of the anchor body 16 is surrounded by a top part 27E and downwardly extending sides 27B and 27C having double angled edges. The V-shaped loop engagement portion 28 is formed of angle portions 28A and 28B.

Figure 4A:
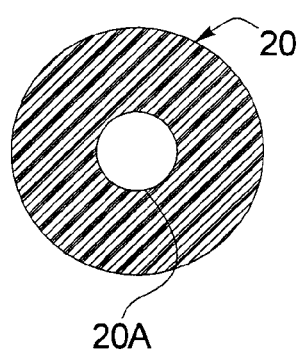
FIGS. 4A, 4B and 4C show three different embodiments from an end view of an elastomeric cylinder employed in the cushioned banding anchor system of FIG. 1.
Figure 4B:
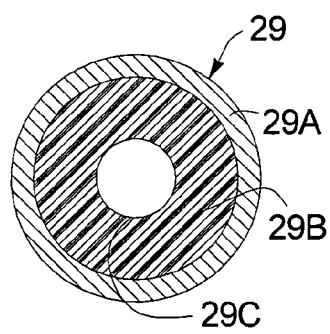
Figure 4C:
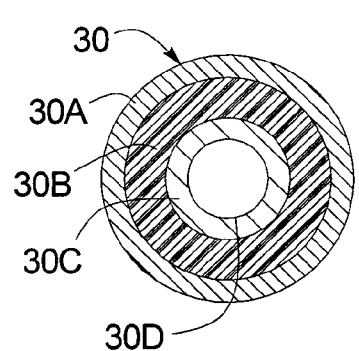

As shown in FIG. 4A, the elastomeric roller cylinder 20 which is preferably polyurethane, may have three different embodiments. In FIG. 4A, the polyurethane cylinder 20 has a central aperture 20A. In FIG. 4B, a different type of cylinder 29 is provided having an outer steel tube 29A with an elastomeric cylinder insert 29B and central aperture 29C. In FIG. 4C, an alternative cylinder 30 is provided having an outer steel tube 30A, an inner elastomeric cylinder insert 30B, and an inner steel tube 30C defining a central aperture 30D.

Although in FIGS. 1, 2 and 3 attachment to the railcar is via a horizontal round bar or tube-type railcar attachment 18, alternative types of frame attachment for the railcar frame 9 may be provided. Three different such alternative and additional embodiments are shown in FIGS. 5A, B; 6A, B; and 7A, B.

Figure 5B:
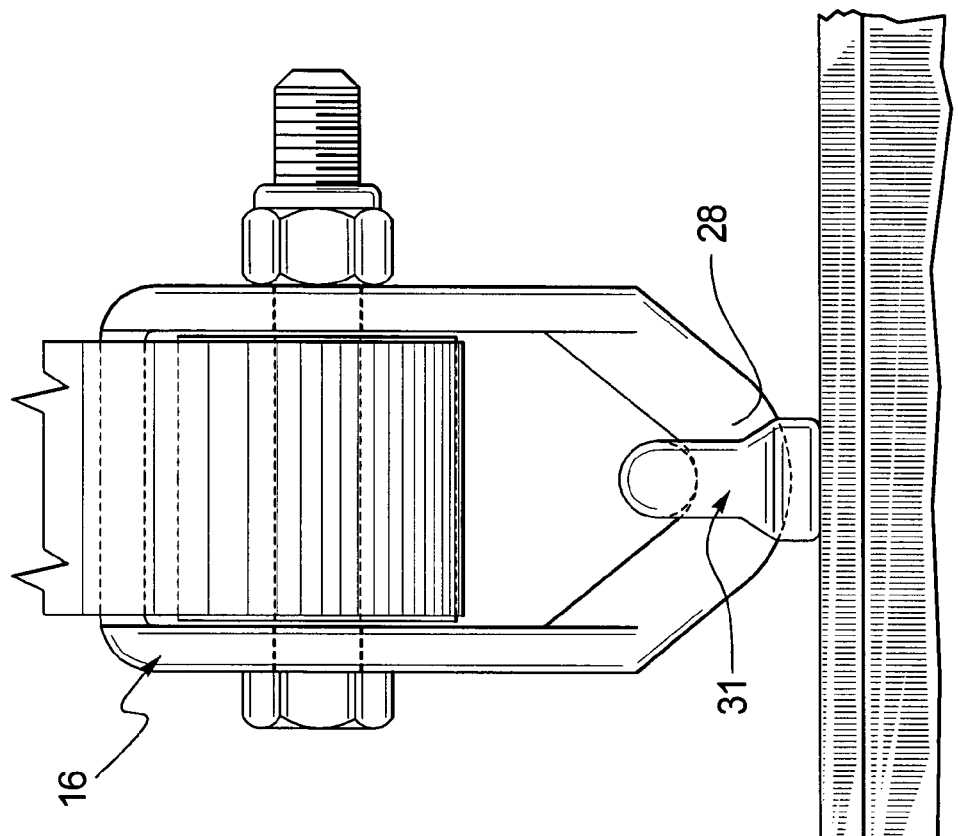
FIGS. 5A and 5B are respective end and side views of an alternative anchoring method for the anchoring system of FIG. 1.
Figure 5A:
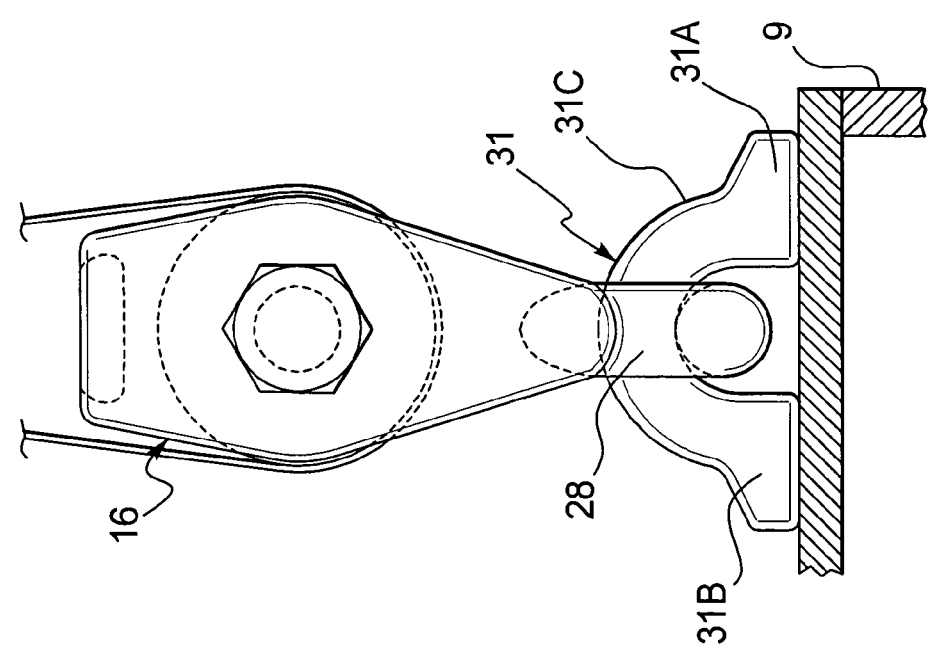

In FIGS. 5A, B, in a new car application, the shackle is not employed. Rather, the loop portion 28 of the banding anchor body 16 is directly attached to an inverted U-shaped frame attachment 31 having a rounded bridge portion 31C and attachment legs 31A, 31B.

Figure 6B:
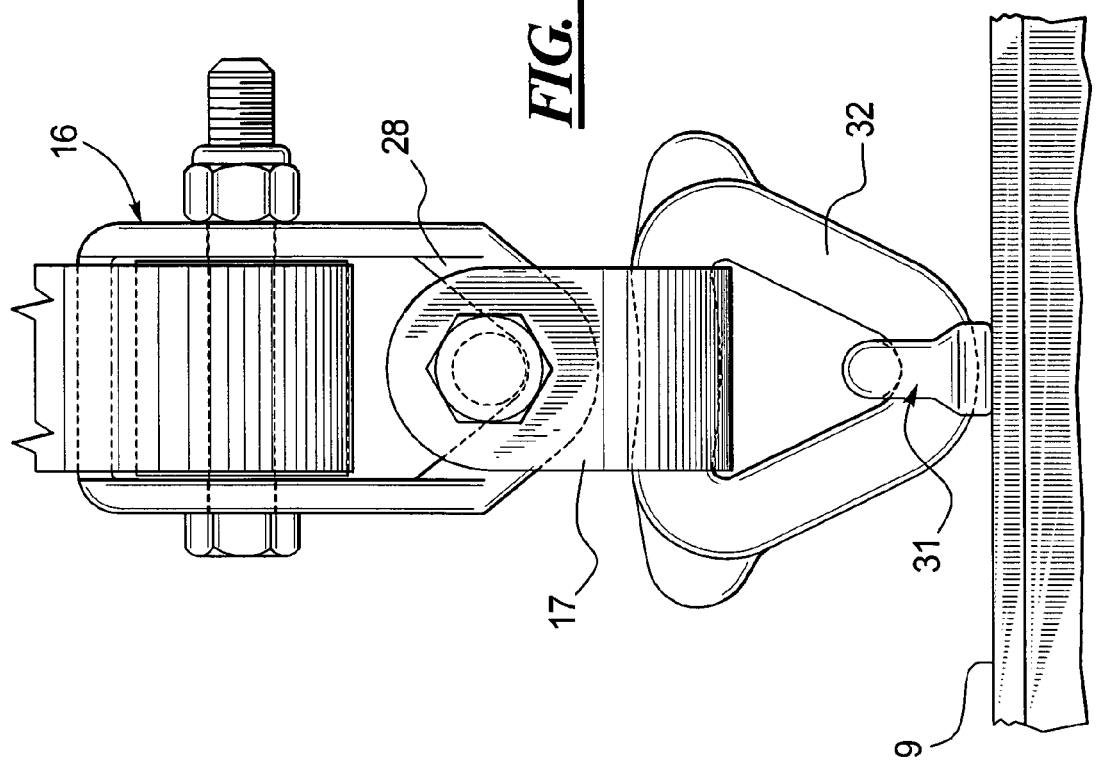
FIGS. 6A and 6B are respective end and side views of a further embodiment of an anchoring method for the cushioned banding anchor system of FIG. 1.
Figure 6A:
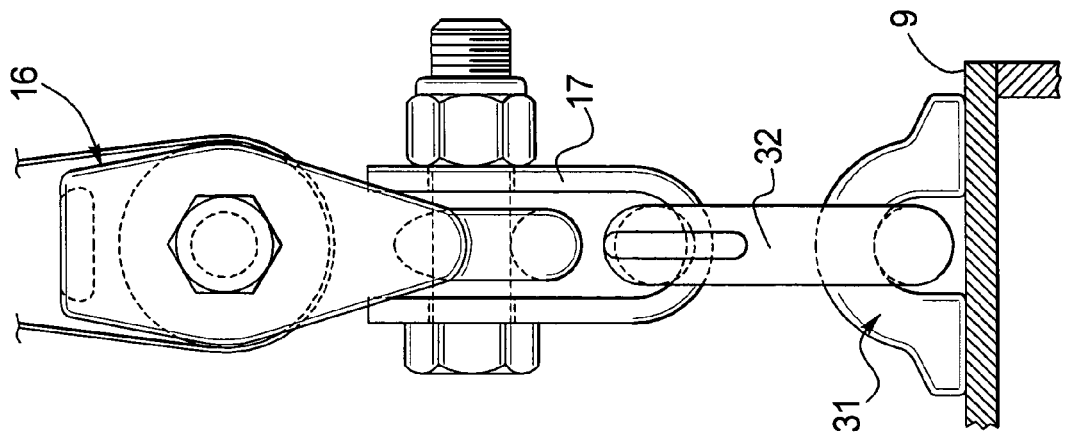

In FIGS. 6A, B, for existing railcars, the inverted U-shaped attachment 31 is attached via a triangular anchor piece 32 with the shackle previously described.

In FIGS. 7A, B, for application to a so-called stake pocket in a railcar having a pocket well 34 with a respective aperture 34A, the shackle 17 is inverted as compared to FIG. 1 and is attached to the aperture 34A by hex bolt 35 with nut 36, which may be tack welded or could also be a nylon insert of a self-locking nut with a nylon insert.

While preferred embodiments have been illustrated and described in detail in the drawings and foregoing description, the same are to be considered as illustrative and not restrictive in character, it being understood that only the preferred embodiments have been shown and described and that all changes and modifications that come within the spirit of the invention both now or in the future are desired to be protected.

I claim as my invention:

1. A cushioned banding anchor for securement of a load to a loading platform having a frame attachment by use of a band having a loop at least at one end, comprising:
   a banding anchor body having a cushioned roller retained within an inside aperture of the anchor body, said cushioned roller being designed to be positioned within the loop of the band; and
   said banding anchor body having a loop portion at one end for connecting to the frame attachment of the loading platform, and wherein at least a portion of a connecting structure associated with said frame attachment passes through said inside aperture and is retained by said loop portion.

2. The anchor of claim 1 when the anchor body comprises a top part and downwardly extending sides merging into said loop portion, said loop portion comprising two angle portions meeting at a rounded portion.

3. The anchor of claim 1 wherein said portion of a connecting structure comprises a bolt through said loop portion which connects said anchor body to a shackle which loops around said frame attachment of the loading platform.

4. The anchor of claim 3 wherein said bolt comprises a hex bolt having a lock nut.

5. A cushioned banding anchor for securement of a load to a loading platform having a frame attachment by use of a band having a loop at least at one end, comprising:
   a banding anchor body having a cushioned roller retained within an inside aperture of the anchor body, said cushioned roller being designed to be positioned within the loop of the band;
   said banding anchor body having a loop portion at one end for connecting to the frame attachment of the loading platform;
   the anchor comprising a top part and downwardly extending sides merging into said loop portion, said loop portion comprising two angle portions meeting at a rounded portion; and
   said downwardly extending sides have double angled edges with a widest portion of each side being located where an aperture is provided in each side for receiving a bolt passing through a middle aperture of said cushioned roller for retaining the cushioned roller within said inside aperture of the anchor body.

6. The anchor of claim 5 wherein said bolt comprises a hex bolt with a lock nut.

7. The anchor of claim 1 when said cushioned roller is retained within said inside aperture of the anchor body by a bolt about which the cushioned roller freely rotates.

8. The anchor of claim 1 wherein said cushioned roller comprises a central aperture surrounded by an elastomeric material.

9. The anchor of claim 8 wherein said elastomeric material comprises polyurethane.

10. The anchor of claim 1 wherein said cushioned roller comprises an elastomeric cylindrical roller having a central aperture surrounded by elastomeric material which in turn is surrounded by an outer steel tube.

11. The anchor of claim 1 wherein said cushioned roller comprises an elastomeric cylindrical roller comprising a central aperture surrounded by an inner steel tube, followed by an outer elastomeric material cylindrical core, followed by an outer steel tube.

12. The anchor of claim 1 wherein said loading platform comprises a railroad car.

13. A cushioned banding anchor system for securement of a load to a loading platform by use of a band having a loop at least at one end, comprising:
   a banding anchor body having a cushioned roller retained within an inside aperture of the anchor body, said cushioned roller being designed to be positioned within the loop of the band;
   said banding anchor body having a loop portion at one end; and
   a connecting member which connects said loop portion to the loading platform, and wherein at least a portion of the connecting member passes through said inside aperture and is retained by said loop portion.

14. The anchor system of claim 13 wherein said connecting member comprises a shackle having a rounded portion which loops around a frame attachment connected to the loading platform, said shackle has side legs with apertures, and a bolt passing through said side leg apertures and positioned through said loop portion of said banding anchor body.

15. The anchor system of claim 14 wherein the frame attachment comprises a bar around which said shackle loops, said bar being attached to the loading platform by downwardly extending ears which support the bar.

16. A cushioned banding anchor system for securement of a load to a loading platform by use of a band having a loop at least at one end, comprising:
   a banding anchor body having a cushioned roller retained within an inside aperture of the anchor body, said cushioned roller being designed to be positioned within the loop of the band;
   said banding anchor body having a loop portion at one end;
   a connecting member which connects said loop portion to the loading platform; and
   said connecting member comprising a frame attachment mounted to the loading platform and comprises an inverted U-shaped attachment having a rounded bridge portion which engages through said loop portion of the anchor body.

17. The anchor system according to claim 13 wherein a frame attachment is connected to the loading platform which comprises an inverted U-shaped attachment having a bridge portion, and wherein said connecting member comprises a triangular-shaped link passing under said bridge portion and linking said bridge portion to said anchor body loop portion.

18. The anchor system according to claim 13 wherein said connecting member comprises a frame attachment connected to the loading platform and comprises a stake pocket having a pocket well with an aperture, a bolt passing through said stake pocket aperture, and the bolt attaching to side legs of a shackle through apertures in the side legs, and a rounded portion of said shackle looping around said loop portion.

19. The anchor system according to claim 13 wherein said loading platform comprises a railroad car.

* * * * *